United States Patent
Agronin

(10) Patent No.: US 8,430,561 B2
(45) Date of Patent: Apr. 30, 2013

(54) NON-CONTACT THERMOMETER

(75) Inventor: Michael L. Agronin, Owings Mills, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/276,002

(22) Filed: Oct. 18, 2011

(65) Prior Publication Data

US 2012/0275487 A1 Nov. 1, 2012

Related U.S. Application Data

(63) Continuation of application No. 12/352,115, filed on Jan. 12, 2009, now Pat. No. 8,042,996.

(60) Provisional application No. 61/060,099, filed on Jun. 9, 2008.

(51) Int. Cl.
*G01J 5/00* (2006.01)
(52) U.S. Cl.
USPC ........................................................... 374/121
(58) Field of Classification Search ............... 374/121, 374/128, 120; 250/388.1; 600/474
See application file for complete search history.

(56) References Cited

U.S. PATENT DOCUMENTS

| | | | |
|---|---|---|---|
| 3,735,136 A | 5/1973 | Flint | |
| 4,343,182 A | 8/1982 | Pompeo | |
| 4,372,690 A | 2/1983 | Berman | |
| 4,372,691 A | 2/1983 | Buckley | |
| 4,566,808 A | 1/1986 | Pompei | |
| 4,722,612 A | 2/1988 | Junkert | |
| 4,896,281 A | 1/1990 | Mack | |
| 5,803,604 A | 9/1998 | Pompei | |
| 6,048,093 A | 4/2000 | Pompei | |
| 6,749,364 B1 * | 6/2004 | Baker et al. | 404/84.5 |
| 7,114,846 B2 * | 10/2006 | Tominaga et al. | 374/121 |
| 7,196,509 B2 | 3/2007 | Teng | |
| 7,276,697 B2 | 10/2007 | Devine | |
| 7,553,070 B2 * | 6/2009 | Kollgaard et al. | 374/5 |
| 2004/0252747 A1 * | 12/2004 | Garvelink et al. | 374/121 |
| 2009/0304042 A1 * | 12/2009 | Agronin | 374/112 |

* cited by examiner

*Primary Examiner* — Lisa Caputo
*Assistant Examiner* — Jamel Williams
(74) *Attorney, Agent, or Firm* — Stephen R. Valancius

(57) ABSTRACT

The present invention is drawn to a non-contact thermometer that is operable to emit a first light having a first color to create a spot of a first color at a reference target and to detect the temperature of the reference target. The non-contact thermometer is additionally operable to establish a temperature difference threshold. In use, once a temperature difference threshold is selected and once the temperature of the reference target is detected, the non-contact thermometer may detect a temperature of another target. Further, if the detected temperature of the other target is outside of the temperature difference threshold as compared to the temperature of the reference target, the non-contact thermometer is operable to emit a second light having a second color to create a spot of a second color at the other target.

7 Claims, 6 Drawing Sheets

NON-CONTACT THERMOMETER

This application is a continuation of U.S. application Ser. No. 12/352,115 filed Jan. 12, 2009 (now U.S. Pat. No. 8,042,996 issued Oct. 25, 2011), which claims the benefit of U.S. Provisional Patent Application No. 61/060,099 filed Jun. 9, 2008.

BACKGROUND

Non-contact thermometers are commonly used for remote temperature detection. Some conventional non-contact thermometers make use of an infrared heat detector known in the art as a thermopile, wherein when the non-contact thermometer device is pointed at a first target and the thermopile detects the temperature at the first target, it displays the temperature on the device. The user must then look at the device to read the measured temperature. Unfortunately, with these conventional non-contact thermometers, a user may unintentionally move the device when reading the temperature. As such, the temperature actually being measured may not correspond to the first target.

Further, some conventional non-contact thermometers allow the user to set a temperature gradient threshold. With these conventional non-contact thermometers, if a temperature is detected that surpasses the temperature gradient threshold, the user is alerted with a sound. However, these conventional non-contact thermometers may be limited in that they can only detect positive temperature changes.

What is needed is a non-contact thermometer that enables the user to visualize a temperature gradient in both the positive and negative direction, without requiring the user to look at the device.

BRIEF SUMMARY

One aspect of the present invention is drawn to a device for use with a first target having a first temperature and a second target having a second temperature. The device comprises a body having a portion, a light emitter, a radiation detector, a temperature difference threshold selector and a controller. The body is operable to move from between a first position such that the portion is directed toward the first target to a second position such that the portion is directed toward the second target. The light emitter is disposed at the body and is operable to emit a first light having a first color and to emit a second light having a second color. The radiation detector is operable to detect first heat discerning radiation based on the first temperature from the first target when the body is disposed at the first position, to generate a first detected signal corresponding to the detected first heat discerning radiation, to detect second heat discerning radiation based on the second temperature from the second target when the body is disposed at the second position and to generate a second detected signal corresponding to the detected second heat discerning radiation. The temperature difference threshold selector is operable to establish an absolute value of a temperature difference threshold from a range of absolute value temperature differences and to generate a temperature difference threshold signal based on the established absolute value of the temperature difference threshold. The controller is operable to determine an absolute value of a temperature difference based on the first detected signal and the second detected signal, to determine whether the absolute value of the temperature difference is within the established absolute value of the temperature difference threshold, to generate a first indication signal when the absolute value of the temperature difference is within the established absolute value of the temperature difference threshold and to generate a second indication signal when the absolute value of the temperature difference is not within the established absolute value of the temperature difference threshold. Further, the light emitter is operable to emit, based on the first indication signal, the first light at the second target. Still further, the light emitter is operable to emit, based on the second indication signal, the second light at the second target.

Another aspect of the present invention is drawn to a device for use with a first target having a first temperature and a second target having a second temperature. The device comprises a first light emitter, a second light emitter, a first radiation detector, a second radiation detector, a temperature difference threshold selector and a controller. The first light emitter is operable to emit a first light having a first color at the first target. The second light emitter is operable to emit the first light at the second target and to emit a second light having a second color at the second target. The first radiation detector is operable to detect first heat discerning radiation based on the first temperature from the first target and to generate a first detected signal corresponding to the detected first heat discerning radiation. The second radiation detector is operable to detect second heat discerning radiation based on the second temperature from the second target and to generate a second detected signal corresponding to the detected second heat discerning radiation. The temperature difference threshold selector is operable to establish an absolute value of a temperature difference threshold from a range of absolute value temperature differences and to generate a temperature difference threshold signal based on the established absolute value of the temperature difference threshold. The controller is operable to determine an absolute value of a temperature difference based on the first detected signal and the second detected signal, to determine whether the absolute value of the temperature difference is within the established absolute value of the temperature difference threshold, to generate a first indication signal when the absolute value of the temperature difference is within the established absolute value of the temperature difference threshold and to generate a second indication signal when the absolute value of the temperature difference is not within the established absolute value of the temperature difference threshold. Further, the second light emitter is operable to emit, based on the first indication signal, the first light at the second target. Still further, the second light emitter is operable to emit, based the second indication signal, the second light at the second target.

In example embodiments of a non-contact thermometer in accordance with the present invention, that emits a colored light beam having a first color, e.g., yellow, at a first target and detects a temperature of the first target. The non-contact thermometer may additionally display the detected temperature for the user. The non-contact thermometer may then be moved to detect a temperature of a second target, and may additionally display the detected temperature of the second target for the user. The non-contact thermometer compares the second detected temperature to the first detected temperature and calculates a temperature differential. The temperature differential is then compared to an established absolute value of a temperature difference threshold. If the second detected temperature is greater than the first detected temperature, that is the temperature of the second target is higher than the temperature of the first target, and if the temperature differential is not within the absolute value of the temperature difference threshold, then the non-contact thermometer emits a colored light beam having a second color, e.g., red at the second target. If the second detected temperature is less than the first detected temperature, that is the temperature of the second target is lower than the temperature of the first target, and if the temperature differential is not within the absolute value of the temperature difference threshold, then the non-contact thermometer emits a colored light beam having a third color, e.g., blue at the second target. This device will provide the user an easy method to view temperature changes along a line.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIG. 5A illustrates an additional example of a non-contact thermometer with multiple sensors and outputs in accordance with the present invention reading a temperature at a first set points in a first area;

DETAILED DESCRIPTION

Figure 1:
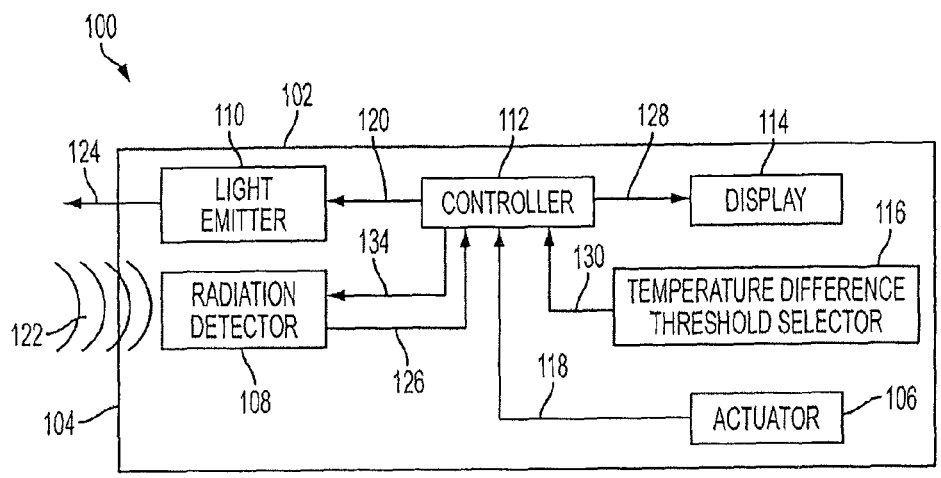
FIG. 1 illustrates a functional block diagram of a non-contact thermometer in accordance with an example embodiment of the present invention.

An exemplary embodiment of a non-contact thermometer in accordance with the present invention will now be described with reference to FIG. 1.

As illustrated in the figure, non-contact thermometer 100 includes a body 102 having a front face 104, an actuator 106, a radiation detector 108, a light emitter 110, a controller 112, a display 114 and a temperature difference threshold selector 116.

Actuator 106 may be any device, structure or system that is operable to actuate controller 112 via a signal 118. In an exemplary embodiment, actuator 106 is a button, a trigger, switch or any other device or system apparent to one skilled in the art that may be manipulated by a user. Upon actuation of actuator 106 by a user, signal 118 is generated.

Radiation detector 108 may be any known device, structure or system that is operable to detect heat-discerning radiation at a remote location, a non-limiting example of which includes an infrared heat detector or thermopile. Once enabled, via signal 134 from controller 112, radiation detector 108 detects heat-discerning radiation from a remote location, for example via thermal radiation 122, and generates a detected signal 126 corresponding thereto.

Light emitter 110 may be any known device, structure or system that is operable to emit light, in direction 124, toward the remote location from which radiation detector 108 detects the heat as discussed above. Once enabled, via signal 132 from controller 112, light emitter 110 emits light having a specific color, for example having a yellow color at the remote location. As discussed in more detail below, light emitter 110 is further capable of emitting light of other colors. Non limiting examples of light emitter 110 include lasers and Light Emitting Diodes (LEDs).

Temperature difference threshold selector 116 may be any known device, structure or system that is operable to establish an absolute value of a temperature difference threshold from a range of absolute value temperature differences. In an exemplary embodiment, temperature difference threshold selector 116 includes a user adjustable selector that is operable to select an absolute value of a range, e.g., ±2° Fahrenheit. The size of the range and the increment of the selection may be determined by desired design parameters.

Once established, for example as selected by a user, temperature difference threshold selector 116, generates a temperature difference threshold signal 130. As discussed in more detail below, when a difference between two temperatures detected by radiation detector 108 is outside of the absolute value of a temperature difference threshold as established by temperature difference threshold selector 116, temperature difference threshold signal 130 will be used to instruct light emitter 110 to stop emitting light of a first color and start transmitting light of a second color via controller 112 as discussed in more detail below.

Display 114 may be any known device, structure or system that is operable to display information based on the heat-discerning radiation 122 detected by radiation detector 108. Non-limiting examples of display 114 include a liquid crystal display (LCD). Non-limiting types of information include numbers, colors, images, bar graphs or pie charts, any one of which indicates a detected temperature to the user.

Controller 112 may be any known device, structure or system that is capable of at least four tasks: 1) determining a temperature difference via a signal 126 provided by radiation detector 108; 2) determine whether the temperature difference is within the established absolute value of the temperature difference threshold as set by temperature difference threshold selector 116; 3) controlling light emitter 110 via signal 132; and 4) controlling radiation detector 108 via signal 126. Further, controller 112 may be additionally capable of providing information to display 114 via a signal 128.

Figure 2A:
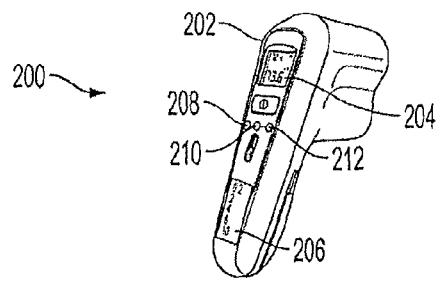
FIG. 2A is an oblique view of a working example embodiment of a non-contact thermometer in accordance with the present invention.

FIG. 2A is an oblique view of a working example embodiment of a non-contact thermometer in accordance with the present invention. In the figure, non-contact thermometer 200 includes a body 202 corresponding to body 102 of FIG. 1, an actuator 208 corresponding to actuator 106 of FIG. 1, a display 204 corresponding to display 114 of FIG. 1, a temperature difference threshold selector 206 corresponding to temperature difference threshold selector 116 of FIG. 1. Non-contact thermometer 200 additionally includes an indicator portion, which in this example has a blue LED 208, a green LED 210, and a red. LED 212. A controller, a light emitter and a radiation detector, which correspond respectively to controller 112, light emitter 110 and radiation detector 108 of FIG. 1, are disposed within body 202 and are not shown in FIG. 2A.

Figure 2B:
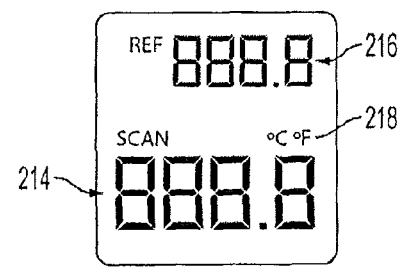
FIG. 2B is an exploded view of a display of the non-contact thermometer of FIG. 2A.

FIG. 2B is an exploded view of display 204, which includes a scanned temperature portion 214, a reference temperature portion 216 and a temperature unit portion 218. In this example embodiment, display 204 is an LCD.

Figure 3A:
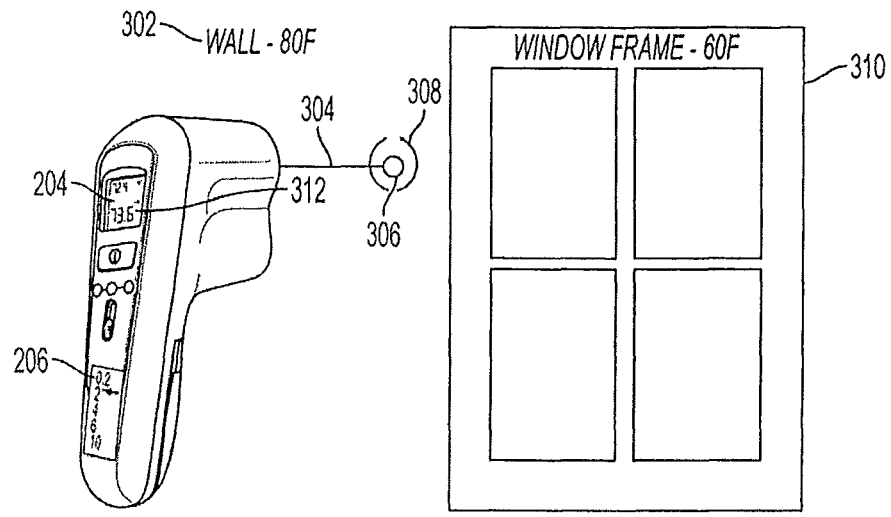
FIG. 3A illustrates an example of a non-contact thermometer in accordance with the present invention reading a temperature at a first point.
Figure 3B:
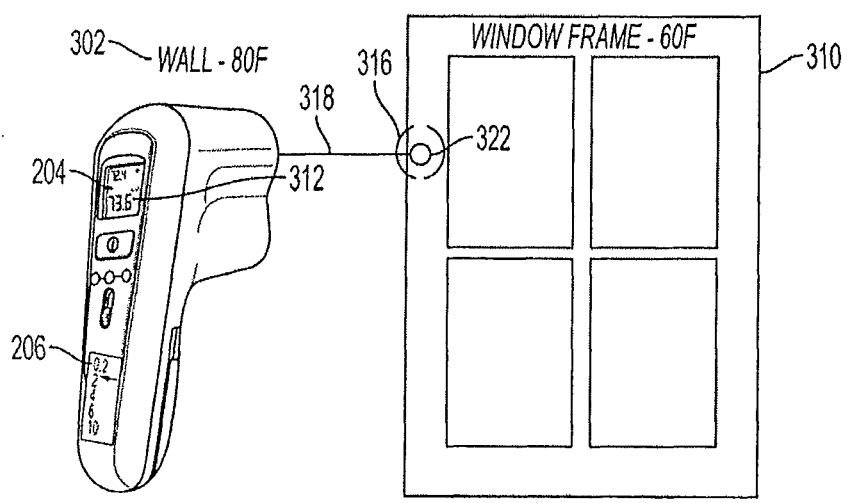
FIG. 3B illustrates an example of a non-contact thermometer in accordance with the present invention reading a temperature at a second point.
Figure 4:
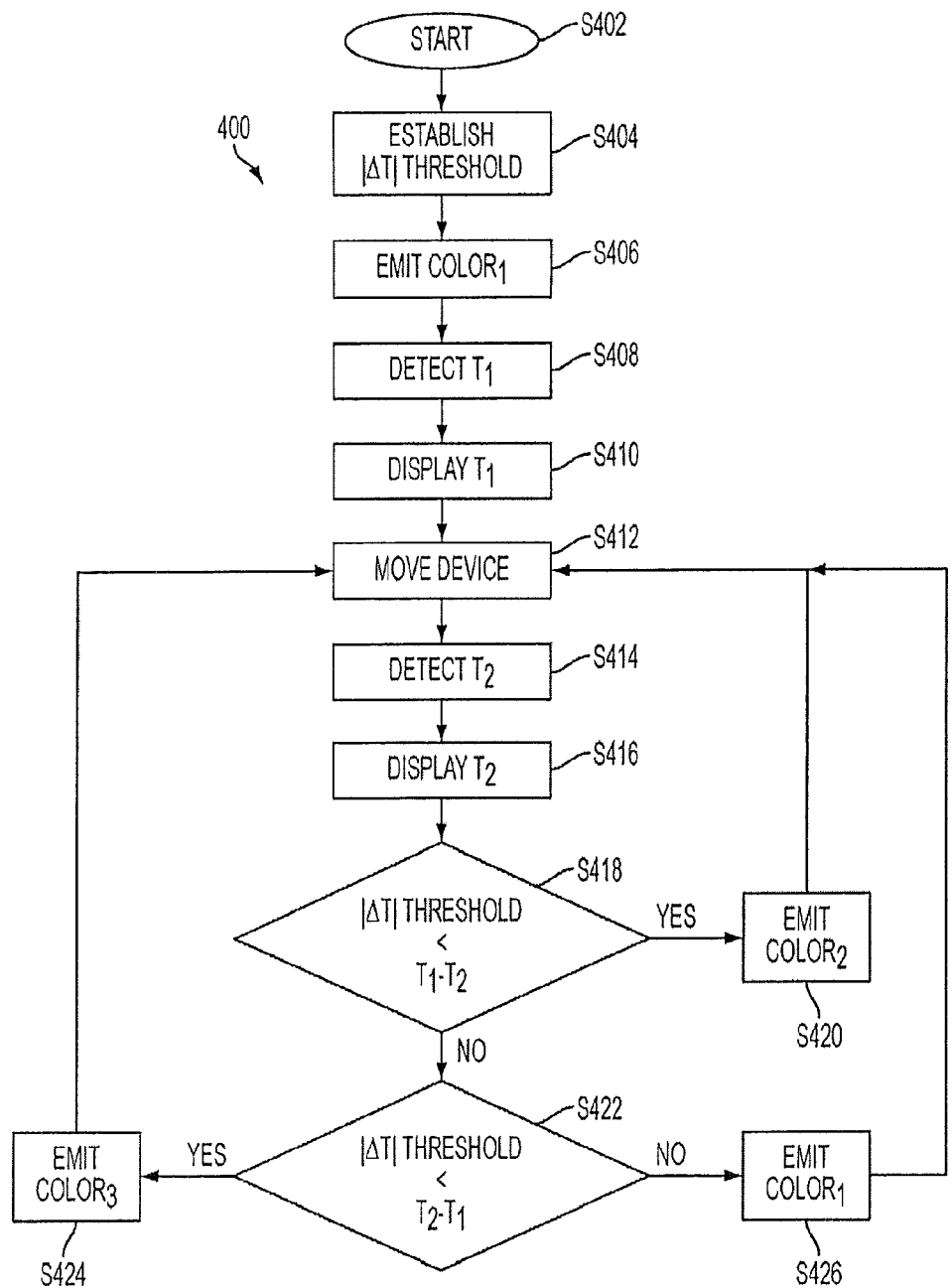
FIG. 4 is a logic flow diagram describing an example of a method of operation of the non-contact thermometer of FIGS. 3A-3B in accordance with the present invention.

Operation of non-contact thermometer 200 will now be described with reference to FIGS. 3A, 3B and 4. FIG. 3A illustrates non-contact thermometer 200 reading a temperature at a first point. FIG. 3B illustrates non-contact thermometer 200 reading a temperature at a second point. FIG. 4 is a logic flow diagram describing an exemplary method of operation of non-contact thermometer 200.

To start (S402), a temperature difference threshold |ΔT| is selected (S404) by the user via temperature difference threshold selector 206. In this embodiment, the choices of ranges include 0.2, 2, 4, 6 and 10° F. or C. (as will be described in more detail below). Selection may be made in any known manner, non-limiting examples of which include a dial or sliding bar. The selected temperature difference threshold |ΔT| will enable non-contact thermometer 200 to easily inform the user when a temperature is detected that is outside of the temperature difference threshold |ΔT|. As such, a user will not be required to pay particular attention to the specific detected temperatures, but will easily be informed once the selected temperature difference threshold |ΔT| is exceeded.

Next, non-contact thermometer 200 is directed at a point on a wall 302, at which the temperature is to be detected. To be sure non-contact thermometer is directed to the right point, controller 112 instructs a light emitter of non-contact thermometer 200 emits a light beam 304 at a first color (S406), which generates a corresponding spot 306 on wall 302. Specifically, with additional reference to FIG. 1, when the user actuates actuator 208, signal 118 is sent to controller 112. Controller 112 may receive signal 118 directly from actuator 208. Alternatively, intermediate circuitry may be included to modify signal 118 prior to controller 112. Non-limiting examples of intermediate circuitry include amplifiers, filters, resistors, and digital devices including pulse shapers, analog-to-digital converters and digital-to-analog converters, etc.

Upon receiving signal 118, controller 112 instructs light emitter 110, via signal 120, to emit light beam 304 to generate spot 306 on wall 302. Light emitter 110 may receive signal 120 directly from controller 112. Alternatively, intermediate circuitry may be included to modify signal 120 prior to light emitter 110. Non-limiting examples of intermediate circuitry include amplifiers, filters, resistors, and digital devices including pulse shapers, analog-to-digital converters and digital-to-analog converters, etc.

Next, the temperature $T_1$ of a portion 308 of wall 302 corresponding to spot 306 is detected (S408). Specifically, with additional reference to FIG. 1, based on receipt of signal 118, controller 112 sends signal 134 to radiation detector 108. Radiation detector 108 may receive signal 134 directly from controller 112. Alternatively, intermediate circuitry may be included to modify signal 134 prior to radiation detector 108. Non-limiting examples of intermediate circuitry include amplifiers, filters, resistors, and digital devices including pulse shapers, analog-to-digital converters and digital-to-analog converters, etc. Upon receiving signal 134, radiation detector 108 detects heat-discerning radiation 122 emanating from portion 308 of wall 302.

In some embodiments, controller 112 sends signals 132 and 134 simultaneously, wherein light emitter 110 generates spot 306 on wall 302 while radiation detector 108 detects heat-discerning radiation 122 emanating from portion 308 of wall 302. These embodiments, enable the user to point, shoot and detect a temperature of a point on wall 302.

In other embodiments, controller 112 first sends signal 132 to light emitter 110 to generate spot 306 on wall 302 and then sends signal 134 to radiation detector 108 to detect heat-discerning radiation 122 emanating from portion 308 of wall 302. These embodiments, enable the user to point, aim with spot 306 at a specific location on wall 302, and then detect a temperature of the specific location on wall 302.

In other embodiments, actuator 208 includes two portions, a first portion operable to activate light emitter 110 and a second portion operable to activate radiation detector 108.

Next, the detected temperature $T_1$ corresponding to portion 308 on wall 302 is displayed to the user (S410). Specifically, with additional reference to FIG. 1, radiation detector 108 sends detected signal 126, which corresponds to detected heat-discerning radiation 122 corresponding to portion 308 on wall 302, to controller 112. Alternatively, intermediate circuitry may be included to modify signal 126 prior to controller 112. Non-limiting examples of intermediate circuitry include amplifiers, filters, resistors, and digital devices including pulse shapers, analog-to-digital converters and digital-to-analog converters, etc. Upon receiving signal 126, controller 112 converts signal 126 into a temperature reading in at least one of user-preselected units of Fahrenheit (F), Celsius (C), Kelvin (K) or Rankine (R). Controller additionally sends signal 128 to display 114. In one example, as illustrated in FIG. 2B, display 114 displays, based on signal 128, detected temperature $T_1$ at portion 214, and indicates that the temperature is measured in the user-preselected units displayed at temperature unit portion 218.

In some embodiments, if detected temperature $T_1$ corresponding to portion 308 on wall 302 is above or below a measurable range of non-contact thermometer 100, controller 112 may then sends signal 128 to display 114, which would indicate that detected temperature T) corresponding to portion 308 on wall 302 is above or below a measurable range of non-contact thermometer 100.

In this embodiment, detected temperature $T_1$ is a reference temperature, to which subsequently detected temperatures will be compared. Specifically, detected temperature $T_1$ is detected by radiation detector 108, is stored in controller 112 via detected signal 126 and used with the selected temperature difference threshold |ΔT| that is selected by temperature difference threshold selector 206, as will be discussed in more detail below. Detected temperature $T_1$ may additionally be displayed on display 204 as reference temperature 312, which in this example indicates to the user that portion 308 of wall 302 corresponds to a temperature of 80° F.

Next, in this embodiment, device 200 is moved (S412) to a second position as shown in FIG. 3B. In the figure, non-contact thermometer 200 is directed at a second point, which in this example is on a window frame 310 that is on wall 302, at which a second temperature is to be detected. To be sure non-contact thermometer is directed to the right point, the light emitter of non-contact thermometer 200 emits a second light beam 318 at a second color, which generates a corresponding spot 322 within a portion 316 of window frame 310 on wall 302. In some cases, the second color may be the same as the first color, whereas in other cases, the second color may be different from first color, as will be discussed in greater detail below.

Next, the temperature $T_2$ of portion 316, of window frame 310 on wall 302, corresponding to spot 322 is detected (S414). Specifically, with additional reference to FIG. 1, when the user actuates actuator 208, signal 118 is sent to 112. Controller 112 may receive signal 118 directly from actuator 208. Alternatively, intermediate circuitry may be included to modify signal 118 prior to controller 112. Non-limiting examples of intermediate circuitry include amplifiers, filters, resistors, and digital devices including pulse shapers, analog-to-digital converters and digital-to-analog converters, etc. Upon receiving signal 118, controller 112 sends signal 134 to radiation detector 108. Radiation detector 108 may receive signal 134 directly from controller 112. Alternatively, intermediate circuitry may be included to modify signal 134 prior to radiation detector 108. Non-limiting examples of intermediate circuitry include amplifiers, filters, resistors, and digital devices including pulse shapers, analog-to-digital converters and digital-to-analog converters, etc. Upon receiving signal 134, radiation detector 108 detects heat-discerning radiation 122 emanating from portion 316 of window frame 310 on wall 302.

In some embodiments, based on signal 118, controller 112 sends signals 134 and 132 simultaneously, wherein light emitter 110 generates spot 322 on window frame 310 on wall 302 while radiation detector 108 detects heat-discerning radiation 122 emanating from portion 316 of window frame 310 on wall 302. These embodiments, enable the user to point, shoot and detect a temperature of a point on window frame 310 on wall 302.

In other embodiments, based on signal 118, controller 112 first sends signal 132 to light emitter 110 to generate spot 322 on window frame 310 on wall 302 and then sends signal 118 to radiation detector 108 to detect heat-discerning radiation 122 emanating from portion 316 of window frame 310 on wall 302. These embodiments, enable the user to point, actuate, aim with spot 322 at a specific location on window frame 310 on wall 302, and detect a temperature of the specific location on window frame 310 on wall 302.

In the example methods discussed above, step S404 is performed before step S406, which is performed before step S408. However in other example methods, steps S404, S406 and S408 can be performed in any order or simultaneously. Further, in the example methods discussed above, step S404 is performed before step S406. However, in other example methods, step S404 can be performed anytime before step S416 discussed in detail below. This gives the user the option to select a different temperature difference threshold |ΔT| 206 if it becomes required before step S416.

Returning back to FIG. 4, detected temperature $T_2$ is then displayed to the user (S416). Specifically, with additional reference to FIG. 1, radiation detector 108 sends signal 126, which corresponds to detected heat-discerning radiation 122 emanating from portion 316 of window frame 310 on wall 302, to controller 112. Alternatively, intermediate circuitry may be included to modify signal 126 prior to controller 112. Non-limiting examples of intermediate circuitry include amplifiers, filters, resistors, and digital devices including pulse shapers, analog-to-digital converters and digital-to-analog converters, etc. Upon receiving signal 126, controller 112 converts signal 126 into a temperature reading in the user-preselected units. Controller additionally sends signal 128 to display 114. In this example, as illustrated in FIG. 2B, display 114 displays, based on signal 128, detected temperature $T_2$ at portion 214, and indicates that the temperature is measured in the user-preselected units displayed at temperature unit portion 218. Referring to FIG. 3B detected temperature $T_2$ may be displayed on display 204 as a scan temperature 320, which in this example, indicates to the user that portion 316 of window frame 310 on wall 302 corresponds to a temperature of 60° F.

Returning briefly to step S412, in other embodiments, device 200 may not be moved to a second position. In other embodiments, after waiting predetermined time period t, controller 112 may instruct radiation detector 108 to detect a second temperature. For example, there may be some cases wherein a single position will change its temperature, a non-limiting example of which includes a heating element. When a single position changes temperature, the light emitter of non-contact thermometer 200 may emit a second light beam 318 at a second color. In some cases, the second color may be the same as the first color, whereas in other cases, the second color may be different from first color.

In the examples discussed above, detected temperature $T_2$ is a temperature that will be compared to detected temperature $T_1$.

In some embodiments, if $T_2$ is less than $T_1$, i.e., portion 316 has a lower temperature than portion 308, then the color of beam 318 is different than the color of beam 304. For example, if portion 316 has a lower temperature than portion 308, then the color of beam 318 may be blue. As such, spot 322 will be blue, signifying that portion 316 is colder than portion 308. Accordingly, the user can easily determine whether a targeted second area, via spot 322, is colder than a first reference area, i.e., spot 306, without looking at non-contact thermometer.

In some embodiments, if $T_2$ is more than $T_1$, i.e., portion 316 has a higher temperature than portion 308, then the color of beam 318 is different than the color of beam 304. For example, if portion 316 has a higher temperature than portion 308, then the color of beam 318 will be red. As such, spot 322 will be red, signifying that portion 316 is hotter than portion 308. Accordingly, the user can easily determine whether a targeted second area, via spot 322, is colder than a first reference area, i.e., spot 306, without looking at non-contact thermometer 200.

In some embodiments, if $T_2$ is more than or less than $T_1$, i.e., portion 316 has a higher or lower temperature than portion 308, then the color of beam 318 is different than the color of beam 304. For example, if portion 316 has a lower temperature than portion 308, then the color of beam 318 will be blue, whereas if portion 316 has a higher temperature than portion 308, then the color of beam 318 will be a red. Accordingly, the user can easily determine whether a targeted second area, via spot 322, is colder or hotter than a first reference area, spot 306, without looking at non-contact thermometer 200.

in example embodiments, controller 112 calculates an absolute value temperature differential between detected temperature $T_1$ and detected temperature $T_2$, i.e. $|T_1-T_2|$. The temperature differential is then compared to temperature difference threshold |ΔT| already stored in controller 112 via signal 130 in step S404. In an example as illustrated in FIG. 3A. 2° F. is selected as temperature difference threshold |ΔT| as indicated by the arrow.

In some embodiments, if the calculated differential between detected temperature $T_1$ and detected temperature $T_2$ is greater than the selected temperature difference threshold |ΔT|, then color the color of the beam corresponding to detected temperature $T_2$ is different than the color of the beam corresponding to detected temperature $T_1$.

In some example embodiments, if the calculated differential between detected temperature $T_1$ and detected temperature $T_2$ is greater than the selected temperature difference threshold |ΔT|, and if $T_2$ is less than $T_1$, i.e., portion 316 has a lower temperature than portion 308, then the color of beam 318 will be blue. As such, spot 322 will be blue, signifying that portion 316 is colder than portion 308, a greater extent than the selected temperature difference threshold |ΔT|. Accordingly, the user can easily determine whether a targeted second area, via spot 322, is more than, say for example, 2° F. colder than a first reference area, i.e., spot 306, without looking at non-contact thermometer 200.

In some example embodiments, if the calculated differential between detected temperature $T_1$ and detected temperature $T_2$ is greater than the selected temperature difference threshold |ΔT|, and if $T_2$ is more than $T_1$, i.e., portion 316 has a higher temperature than portion 308, then the color of beam 318 will be red. As such, spot 322 will be red, signifying that portion 316 is hotter than portion 308, a greater extent than the selected temperature difference threshold |ΔT|. Accordingly, the user can easily determine whether a targeted second area, via spot 322, is more than, say for example, 2° F. hotter than a first reference area, i.e., spot 306, without looking at non-contact thermometer 200.

In some example embodiments, if the calculated differential between detected temperature $T_1$ and detected temperature $T_2$ is greater or less than the selected temperature difference threshold |ΔT|, and if $T_2$ is more or less than $T_1$, i.e., portion 316 has a higher or lower temperature than portion 308, then the color of beam 318 will be red or blue. As such, spot 322 will be red or blue, signifying that portion 316 is hotter or colder than portion 308, a greater extent than the selected temperature difference threshold |ΔT|. Accordingly, the user can easily determine whether a targeted second area, via spot 322, is more than, say for example, 2° F. hotter or colder than a first reference area, i.e., spot 306, without looking at non-contact thermometer 200.

The aspect of the present invention drawn to changing the color of the emitted light corresponding to the calculated differential between detected temperature $T_1$ and detected temperature $T_2$ and the selected temperature difference threshold |ΔT| will now be further described with reference to an example embodiment.

Returning to FIG. 4, controller 112 determines whether detected temperature $T_2$ is less than detected temperature $T_1$, and whether the difference between detected temperature $T_1$ and detected temperature $T_2$ is greater than the temperature difference threshold |ΔT| (S418). If "YES," then controller 112 sends signal 132 to light emitter 110 to change the color of beam 124 from a first color to a second color (S420). In an example embodiment, a first amber color is changed to a second blue color. As mentioned above, in such a case the user can easily determine whether a targeted second area, via spot 322, is more than, say for example, 2° F. colder than a first reference area, i.e., spot 306, without looking at non-contact thermometer 200. The process then returns to step S412, wherein system 102 is moved to another spot or a predetermined time is passed.

If the determination of step S418 is "NO," then controller 112 determines whether detected temperature $T_2$ is greater than detected temperature $T_1$ and whether the difference between detected temperature $T_2$ and detected temperature $T_1$ is greater than the temperature difference threshold |ΔT| (S422). If "YES," then controller 112 sends signal 132 to light emitter 110 to change the color of beam 124 from a first color to a third color (S424). In an example embodiment, a first amber color is changed to a third red color. As mentioned above, in such a case the user can easily determine whether a targeted second area, via spot 322, is more than, say for example, 2° F. hotter than a first reference area, i.e., spot 306, without looking at non-contact thermometer 200. The process then returns to step S412, wherein system 102 is moved to another spot or a predetermined time is passed.

If the determination of step S422 is "NO," then the first color is not changed (S426). The process 400 may then be repeated by the user re-initializing the actuator 208 or continuing to move the device (S412) to detect a new value of $T_2$ (S414).

In the example embodiment discussed above with respect to FIG. 4, step S404 is performed before step S406, which is performed before S408. In other embodiments S408 may be performed before either one of step S404 or step S406. In still other embodiments step S406 may be performed before step S404. In still other embodiments, step S404, step S406 and step S408 may be performed concurrently.

Figure 5:
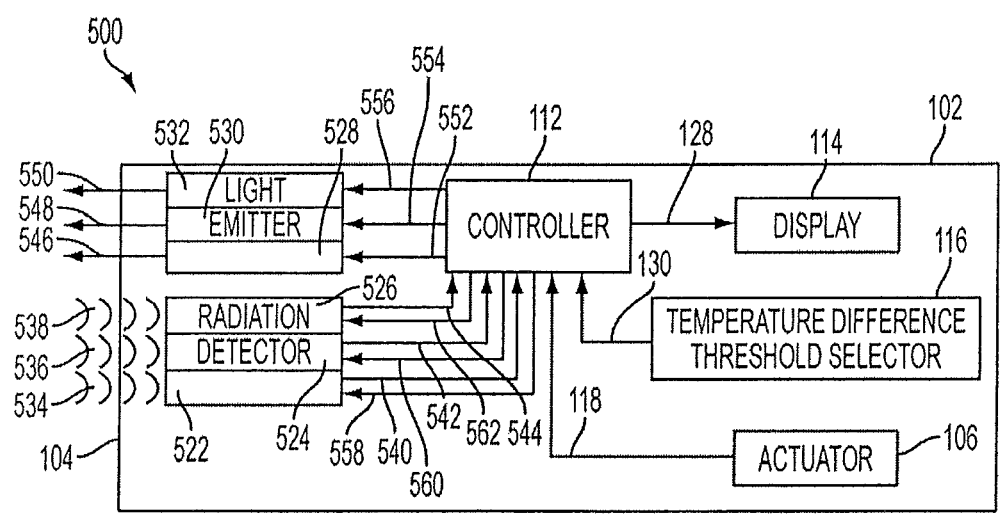
FIG. 5 illustrates a functional block diagram of a non-contact thermometer in accordance with another example embodiment of the present invention.

In the example embodiment discussed above with respect to FIG. 1, there is a single light emitter that is operable to emit light in three different colors and a single selected temperature difference threshold. In other embodiments, the single light emitter may emit light in more than three colors and more than one temperature difference threshold may be selected. Accordingly, such embodiments may easily indicate to the user when any one of a plurality of temperature difference thresholds is surpassed. In still other embodiments, there is a plurality of light emitters that are operable to emit light in a plurality of different colors and a single selected temperature difference threshold. In still other embodiments, a plurality of light emitters is operable to emit light in a plurality of different colors and more than one temperature difference threshold may be selected. Accordingly, such embodiments may easily indicate to the user when any one of a plurality of temperature difference thresholds is surpassed. An example of another embodiment of a non-contact thermometer in accordance with the present invention will now be described with reference to FIG. 5. FIG. 5 is similar to the one of FIG. 1 but differs somewhat as discussed below.

As illustrated in FIG. 5, non-contact thermometer 500 includes a body 102 having a front face 104, an actuator 106, radiation detectors 522, 524 and 526, light emitters 528, 530 and 532, controller 112, a display 114 and a temperature difference threshold selector 116.

Actuator 106 may be any device, structure or system that is operable to enable controller 112 via signal 118.

Radiation detectors 522, 524 and 526 may each be any known device, structure or system that is operable to detect heat-discerning radiation at a remote location, a non-limiting example of which includes an infrared heat detector or thermopile. Once enabled, via signals 558, 560 and 562, radiation detectors 522, 524 and 526, respectively, detect heat-discerning radiation from remote locations, for example respectively via heat-discerning radiation 534, 536 and 538, and respectively generate three independent detected signals 540, 542 and 544 corresponding thereto.

Light emitters 528, 530 and 532 may each be any known device, structure or system that is operable to emit light, respectively in direction, toward the remote locations from which respective radiation detectors 522, 524 and 526 detect the heat-discerning radiation as discussed above. Light emitter 528 emits, via signal 552, light 546 toward the remote location from which radiation detector 522 detects heat-discerning radiation 534. Light emitter 530 emits, via signal 554, light 548 toward the remote location from which radiation detector 524 detects heat-discerning radiation 536. Light emitter 532 emits, via signal 556, light 550 toward the remote location from which radiation detector 526 detects heat-discerning radiation 538. All other aspects of light generation with specific colors and operation of light emitters 528, 530 and 532 are the same as previously discussed in reference to FIG. 1.

Temperature difference threshold selector 116 may be any known device, structure or system that is operable to establish an absolute value of a temperature difference threshold. |ΔT| from a range of absolute value temperature differences. The operation is the same as previously discussed in reference to FIG. 1 with the following exception. When the size of the range and the increment of the selection are established, for example as selected by a user, temperature difference threshold selector 116, generates a temperature difference threshold signal 130. As discussed in more detail below, when a difference between two temperatures detected by any of radiation detectors 522, 524 and 526 is outside of the absolute value of a temperature difference threshold as established by temperature difference threshold selector 116, temperature difference threshold signal 130 may instruct controller 112 to instruct the correct light emitter or emitters of light emitters 528, 530 and 532 to emit light of a specific color.

Display 114 may be any known device, structure or system that is operable to display information based on the heat-discerning radiation 534, 536 and 538 detected by at least one of radiation detectors 522, 524 and 526. All other aspects of display 114 are the same as previously discussed in reference to FIG. 1.

Controller 112 may be any known device, structure or system that is capable of at least four tasks: 1) determining absolute values of three temperature differences based on signals 540, 542 and 544 provided by radiation detectors 522, 524 and 526, respectively; 2) determine whether the absolute values of the temperature differences are within an established absolute value of the temperature difference threshold as set by temperature difference threshold selector 116; 3) controlling light emitters 528, 530 and 532 via signals 552, 554 and 556, respectively; and 4) controlling radiation detectors 522, 524, and 526, via signals 558, 560 and 562, respectively. Further, controller 112 may be additionally capable of providing information to display 114 via signal 128.

Figure 6A:
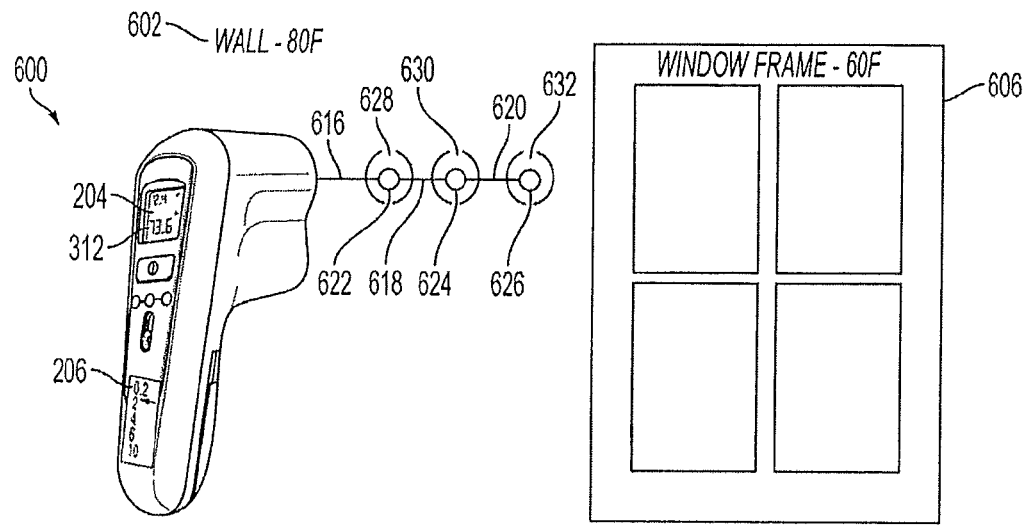
FIG. 6B illustrates an additional example of a non-contact thermometer with multiple sensors and outputs in accordance with the present invention reading a temperature at a second set of points in a second area.
Figure 6B:
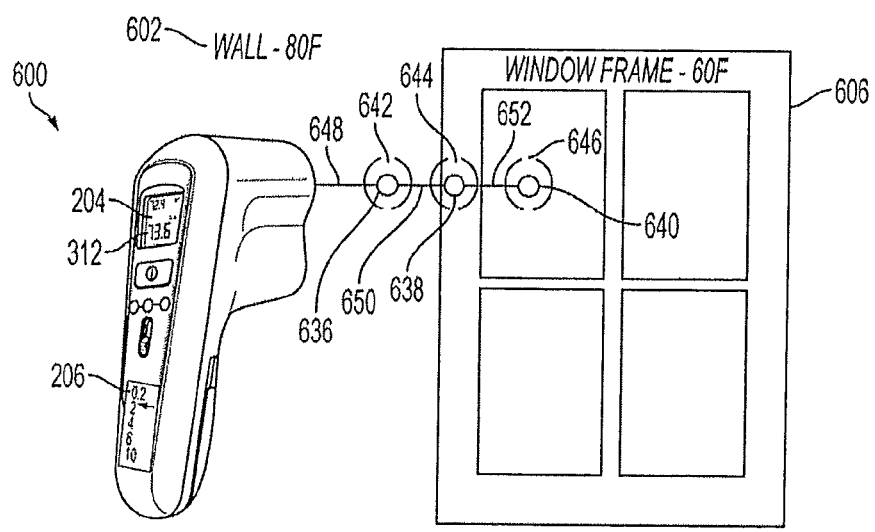
Figure 7:
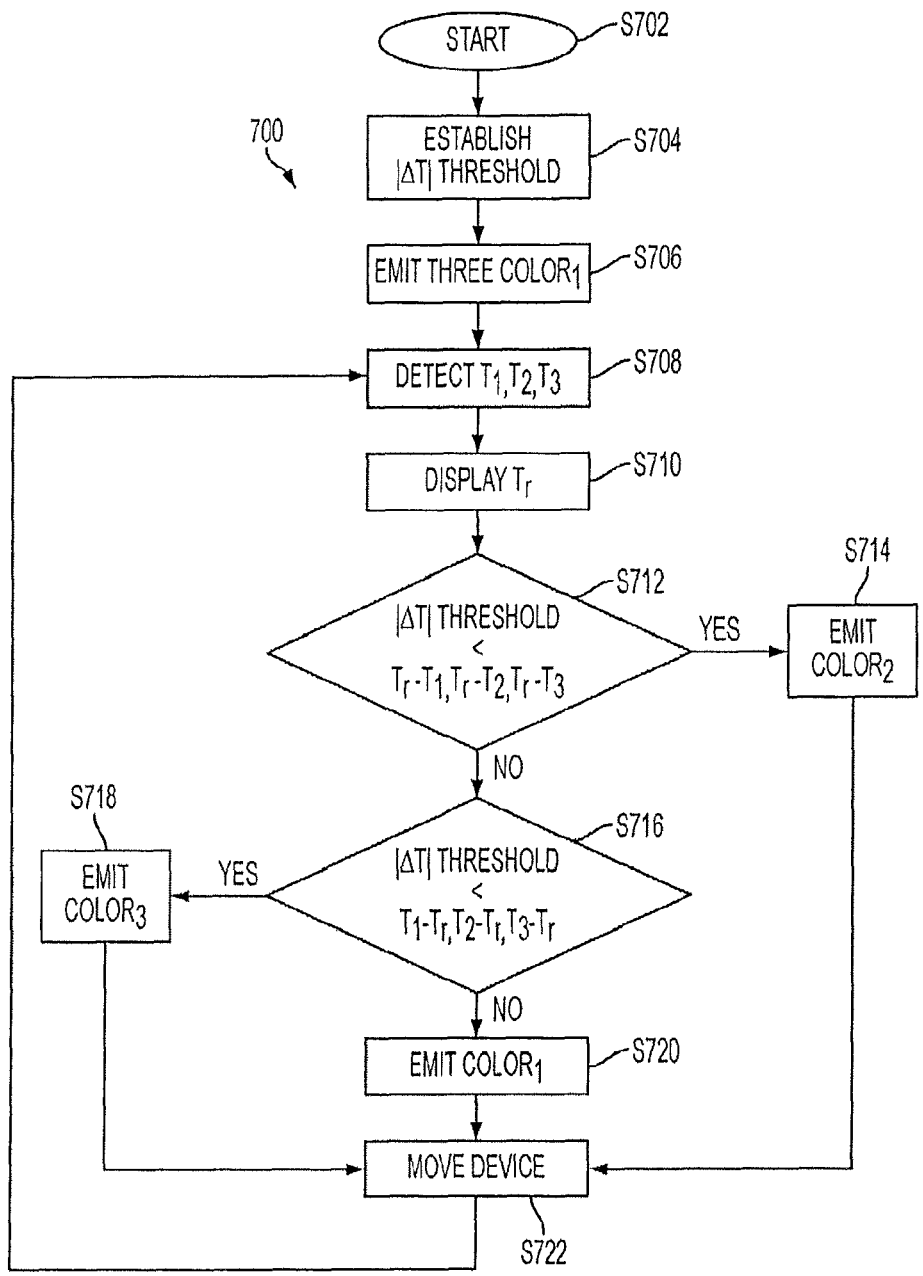
FIG. 7 is a logic flow diagram describing an example of a method of operation of the non-contact thermometer of FIGS. 6A-6B in accordance with the present invention.

FIG. 6A is an oblique view of another working example embodiment of a non-contact thermometer 600 in accordance with the present invention that is reading temperatures at a first point. FIG. 6B illustrates non-contact thermometer 600 reading temperatures at a second point. Non-contact thermometer 600 differs from non-contact thermometer 200 of FIGS. 2A and 2B discussed above in that non-contact thermometer 600 includes three light emitters and three radiation detectors as discussed with respect to FIG. 5. FIG. 7 is a logic flow diagram describing an exemplary method of operation of non-contact thermometer 600. Operation of non-contact thermometer 600 will now be described with reference to FIGS. 6A, 6B and 7.

To start (S702), a temperature difference threshold |ΔT| is selected (S704) by the user via temperature difference threshold selector 206. In this embodiment, the choices of ranges include 0.2, 2, 4, 6 and 10° F. or C. (as will be described in more detail below). Selection may be made in any known manner, non-limiting examples of which include a dial or sliding bar. The selected temperature difference threshold |ΔT| will enable non-contact thermometer 600 to easily inform the user where and when a temperature is detected that is outside of the selected temperature difference threshold |ΔT|. As such, a user will not be required to pay particular attention to the specific detected temperatures, but will easily be informed once the selected temperature difference threshold |ΔT| is exceeded.

Next, non-contact thermometer 600 is directed at points on a wall 602, at which the temperatures are to be detected. To be sure non-contact thermometer is directed to the right points, light emitters of non-contact thermometer 600 emit light beams 616, 618 and 620 at a first color (S706), which generate respective corresponding spots 622, 624 and 626 on wall 602. Specifically, with additional reference to FIG. 5, when the user actuates actuator 208, a signal 118 is sent to controller 112. Alternatively, intermediate circuitry may be included to modify signal 118 prior to controller 112. Non-limiting examples of intermediate circuitry include amplifiers, filters, resistors, and digital devices including pulse shapers, analog-to-digital converters and digital-to-analog converters, etc.

Upon receiving signal 118, controller 112 instructs light emitters 528, 530 and 532, via signals 552, 554 and 556, respectively, to emit light beams 546, 548, and 550 to generate spots 628, 630 and 632, respectively on wall 602. Light emitters 528, 530 and 532 may receive signals 552, 554 and 556, respectively, directly from controller 112. Alternatively, intermediate circuitry may be included to modify signals 552, 554 and 556, respectively, prior to light emitters 528, 530 and 532. Non-limiting examples of intermediate circuitry include amplifiers, filters, resistors, and digital devices including pulse shapers, analog-to-digital converters and digital-to-analog converters, etc.

Next, the temperatures $T_1$, $T_2$, and $T_3$ of portions 628, 630 and 632 corresponding respectively to spots 622, 624 and 626 are detected (S708). Specifically, with additional reference to FIG. 5, when the user actuates actuator 208, signal 118 is sent to radiation detectors 522, 524 and 526. Radiation detectors 522, 524 and 526 may receive signal 118 directly from actuator 208. Alternatively, intermediate circuitry may be included to modify signal 118 prior to radiation detectors 522, 524 and 526. Non-limiting examples of intermediate circuity include amplifiers, filters, resistors, and digital devices including pulse shapers, analog-to-digital converters and digital-to-analog converters, etc. Upon receiving signal 118, radiation detectors 522, 524 and 526 respectively detect heat-discerning radiation 534, 536 and 538 emanating respectively from portions 628, 630 and 632 of wall 602.

In some embodiment, actuation of actuator 208 sends signals 118 and 120 simultaneously, wherein light emitters 528, 530 and 532 respectively generate spots 622, 624 and 626 on wall 602 while radiation detectors 522, 524 and 526 respectively detect heat-discerning radiation 534, 536 and 538 emanating respectively from portions 628, 630 and 632 of wall 602. These embodiments, enable the user to point, shoot and detect temperatures of points on wall 602.

In other embodiments, a first actuation of actuator 208 sends signal 120 to light emitters 528, 530 and 532 to respectively generate spots 622, 624 and 626 on wall 602 and a second actuation of actuator 208 sends signal 118 to radiation detectors 522, 524 and 526 to respectively detect heat-discerning radiation 534, 536 and 538 emanating respectively from portions 628, 630 and 632 of wall 602. These embodiments, enable the user to point, actuate, aim with spots 622, 624 and 626 at specific locations on wall 602, actuate again and detect temperatures of multiple specific locations on wall 602.

In other embodiments, actuator 208 includes two portions, a first portion operable to activate light emitters 528, 530 and 532 and a second portion operable to activate radiation detectors 522, 524 and 526.

Next, a reference temperature $T_r$ is displayed to the user (S710). In some embodiments, reference temperature $T_r$ may be any one of temperature $T_1$ corresponding to portion 628 on wall 602, temperature $T_2$ corresponding to portion 630 on wall 602 or temperature $T_3$ corresponding to portion 632 on wall 602. In some embodiments, reference temperature $T_r$ may be based on any one of temperature $T_1$ corresponding to portion 628 on wall 602, temperature $T_2$ corresponding to portion 630 on wall 602 or temperature $T_3$ corresponding to portion 632 on wall 602. In some embodiments, reference temperature $T_r$ may be an average of temperature $T_1$ corresponding to portion 628 on wall 602, temperature $T_2$ corresponding to portion 630 on wall 602 and temperature $T_3$ corresponding to portion 632 on wall 602.

In one example embodiment, with additional reference to FIG. 5, radiation detector 524 sends signal 542, which corresponds to detected heat-discerning radiation 536 corresponding to portions 630 of wall 602, to controller 112. Alternatively, intermediate circuitry may be included to modify signal 542 prior to controller 112. Non-limiting examples of intermediate circuitry include amplifiers, filters, resistors, and digital devices including pulse shapers, analog-to-digital converters and digital-to-analog converters, etc. Upon receiving signal 542, controller 112 converts signal 542 into a temperature reading in at least one of user-pre-selected units of Fahrenheit (F), Celsius (C), Kelvin (K) or Rankine (R). Controller additionally sends signal 128 to display 114. In one example, similar to the example as illustrated in FIG. 2B, display 114 displays, based on signal 128, detected temperature $T_2$ at portion 214, and indicates that the temperature is measured in the user-preselected units displayed at temperature unit portion 218.

In other embodiments, detected temperatures $T_1$, $T_2$, and $T_3$ corresponding to portions 628, 630 and 632 on wall 602 can be displayed to the user. Upon receiving signals 540, 542 and 544, which correspond to detected heat-discerning radiation 534, 536 and 538, respectively, which correspond to portions 628, 630 and 632, respectively, of wall 602, controller 112 convert's signals 540, 542 and 544 into a temperature readings where they would be displayed, for one example on three separate portions on display 114.

In this embodiment, presume reference temperature $T_r$, corresponds to the temperature of portion 630 on wall 602. $T_r$ may be compared with present and subsequently detected temperatures. In FIG. 6A, detected temperatures $T_1$, $T_2$ and $T_3$ corresponding to portions 628, 630 and 632, respectively, on wall 602 are temperatures that will be compared to detected temperature $T_r$.

In some example embodiments, controller 112 calculates an absolute value temperature differential between detected temperatures $T_1$ and $T_r$, absolute value temperature differential between detected temperatures $T_2$ and $T_r$ and an absolute value temperature differential between detected temperatures $T_3$ and $T_r$, i.e. $|T_1-T_r|$, $|T_2-T_r|$ and $|T_3-T_r|$. The temperature differentials are then compared to the selected temperature difference threshold $|\Delta T|$ already stored in controller 112 via signal 130 in step S704. In an example as illustrated in FIG. 6A, 2° F. is selected as temperature difference threshold $|\Delta T|$.

In some embodiments, if the calculated differential between detected temperatures $T_1$, $T_2$ and $T_3$ and reference temperature $T_r$ is greater than the selected temperature difference threshold $|\Delta T|$, then the respective color of the beam corresponding to the spot emanating the temperature $T_1$, $T_2$ and $T_3$ may be different than the color of the beam corresponding to the reference temperature $T_r$.

In some embodiments, if any of temperatures $T_1$, $T_2$ and $T_3$ is lower than $T_r$, and the difference between $T_r$ and the lower temperatures is greater than the selected temperature difference threshold $|\Delta T|$ then some or all of colors may change from originally emitted colors. For example, if portion 632 has a lower temperature than portion 630, which in this example is the temperature of $T_r$, and the difference between the temperature corresponding to portion 630 and the temperature corresponding to portion 632 is greater than the selected temperature difference threshold $|\Delta T|$, then the color of light beam 620 may change from an initial amber color to a blue color. As such, spot 632 may change from amber to blue, signifying that portion 632 is colder than, portion 630. Accordingly, the user can easily determine that a temperature gradient exists between spot 626 and spot 624, without looking at non-contact thermometer 600.

In some embodiments, if any of temperatures $T_1$, $T_2$ and $T_3$ is higher than $T_r$, and the difference between $T_r$ and the higher temperatures is greater than the selected temperature difference threshold $|\Delta T|$, then some or all of colors may change from originally emitted colors. For example, if portion 632 has a higher temperature than portion 630, which in this example is the temperature of $T_r$, and the difference between the temperature corresponding to portion 630 and the temperature corresponding to portion 632 is greater than the selected temperature difference threshold $|\Delta T|$, then the color of light beam 620 may change from an initial amber color to a red color. As such, spot 632 may change from amber to red, signifying that portion 632 is hotter than portion 630. Accordingly, the user can easily determine that a temperature gradient exists between spot 626 and spot 624, without looking at non-contact thermometer 600.

In some embodiments, if at least one of temperatures $T_1$, $T_2$ and $T_3$ is higher than $T_r$, and at least one of temperatures $T_1$, $T_2$ and $T_3$ is lower than $T_r$, and the differences between $T_r$ and the other temperatures is greater than the selected temperature difference threshold $|\Delta T|$, then some or all of colors may change from originally emitted colors. For example, if portion 632 has a lower temperature than portion 630, which in this example has the same temperature as $T_r$, and the difference between the temperature corresponding to portion 630 and the temperature corresponding to portion 632 is greater than the selected temperature difference threshold $|\Delta T|$, and if portion 628 has a higher temperature than portion 630 and the difference between the temperature corresponding to portion 628 and the temperature corresponding to portion 630 is greater than the selected temperature difference threshold $|\Delta T|$, then the color of light beam 620 may change from an amber color to a blue color whereas the color light beam 616 may change from an amber color to a red color. Accordingly, a user may easily see that a temperature gradient exists between spot 622 and spot 624, and another temperature gradient exists between spot 624 and 626, without looking at non-contact thermometer 600.

Returning to FIG. 7A, controller 112 determines whether any of detected temperatures $T_1$, $T_2$, and $T_3$ is less than reference temperature $T_r$, and whether the calculated differential between detected temperatures $T_1$, $T_2$, and $T_3$ and reference temperature $T_r$ is greater than the selected temperature difference threshold $|\Delta T|$ (S712). If "YES," then controller 112 sends signals 552, 554 and/or 556 to respective light emitter 528, 530, and 532 to change respective colors of the emitted light beams (S714). In an example embodiment, a first having an amber color is changed to a second having a blue color. As mentioned above, in such a case the user can easily determine where a temperature differential exists, via spots 622 and 626, is more than, say for example, 2° F. colder than a reference area, e.g., spot 624, without looking at non-contact thermometer 600.

If the determination of step S712 is "NO," then controller 112 determines whether any of detected temperatures $T_1$, $T_2$, and $T_3$ is more than reference temperature $T_r$, and whether the calculated differential between detected temperatures $T_1$, $T_2$, and $T_3$ and reference temperature $T_r$, is greater than the selected temperature difference threshold $|\Delta T|$ (S716). If "YES," then controller 112 sends signal 552, 554 and/or 556 to respective light emitter 528, 530 and 532 to change respective colors of the emitted light beams (S718) in an example embodiment, a first having an amber color is changed to a third color having a red color. As mentioned above, in such a case the user can easily determine where a temperature gradient exists, via spots 622 and 626, is more than, say for example, 2° F. hotter than a reference area, e.g., spot 624, without looking at non-contact thermometer 600.

If the determination of any or all of the circumstances of step S716 is "NO," then the respective first color is emitted, or is continued to be emitted (S720). Process 700 may be repeated by starting again S702 when the user re-initializes the actuator 208 or the device may be moved (S722) to a second location as shown in FIG. 6B, to detect new values of temperature $T_1$, $T_2$, and $T_3$ (S708).

In FIG. 6B, non-contact thermometer 600 is directed toward a second location on the wall, which in this example is partially on a window frame 606 that is on wall 602, at which a second set of temperatures are to be detected. To be sure non-contact thermometer is directed to the right point area, the light emitters of non-contact thermometer 600 emit a second set of light beams 648, 650 and 652, which generate spots 636, 638 and 640, respectively, at portions 642, 644 and 646, respectively, of window frame or partially of window frame 606 on wall 602.

Next, new temperatures $T_1$, $T_2$, and $T_3$ of portions 642, 644 and 646, respectively, which correspond to spots 636, 638 and 640, respectively are detected (S708). Specifically, with additional reference to FIG. 5, when the user actuates actuator 208, signal 118 is sent to controller 112. Controller 112 then sends signals 558, 560 and 562 to radiation detectors 522, 524 and 526. Radiation detectors 522, 524 and 526 may receive signal 118 directly from actuator 208. Alternatively, intermediate circuitry may be included to modify signal 118 prior to radiation detectors 522, 524 and 526. Non-limiting examples of intermediate circuitry include amplifiers, filters, resistors, and digital devices including pulse shapers, analog-to-digital converters and digital-to-analog converters, etc. Upon receiving signal 118, radiation detectors 522, 524 and 526 detect heat-discerning radiation 534, 536 and 538 emanating respectively from portions 642, 644 and 646, respectively, of wall 602.

In some embodiments, actuation of actuator 208 sends signals 118 and 120 simultaneously, wherein light emitters 528, 530 and 532, respectively, generate spots 636, 638 and 640, while radiation detectors 522, 524 and 526, detect heat-discerning radiation 534, 536 and 538, emanating respectively from portions 642, 644 and 646. These embodiments, enable the riser to point, shoot and detect a temperature of a point on window frame or partially on window frame 606 on wall 602.

In other embodiments, a first actuation of actuator 208 sends signal 120 to light emitters 528, 530 and 532 to generate respective spots 636, 638 and 640 and a second actuation of actuator 208 sends signal 118 to radiation detectors 522, 529 and 526 to detect respective heat-discerning radiation 534, 536 and 538. These embodiments enable the user to point, actuate, and aim with spots 636, 638 and 640 at a specific location on window frame or partially on window frame 606 on wall 602, and actuate again to detect a temperature of the specific location.

In other embodiments, actuator 208 includes two portions, a first portion operable to activate light emitters 528, 530 and 532 and a second portion operable to activate radiation detectors 522, 524 and 526.

In the methods discussed above, step S704 is performed before step S706, however step S704 can be performed anytime before step S712 and may be repeated at prior to step S726 as discussed in detail below. This gives the user the option to select a different temperature difference threshold $|\Delta T|$ if required before step S722.

In some embodiments, detected new temperatures $T_1$, $T_2$, and $T_3$ corresponding to portions 642, 644 and 646 on or partially on window frame 606 of wall 602 can be displayed to the user. Upon receiving signals 540, 542 and 544, which respectively corresponds to detected heat-discerning radiation 534, 536 and 538, which respectively correspond to portions 642, 644 and 646 on or partially on window frame 606 of wall 602, controller 112 convert's signals 540, 542 and 544 into a temperature readings where they would be displayed, for one example on three separate portions on display 114.

In this example, detected new temperatures $T_1$, $T_2$, and $T_3$ are temperatures that will be compared to reference temperature $T_r$.

In some example embodiments, controller 112 calculates an absolute value temperature differential between detected new temperature $T_1$ and reference temperature $T_r$, an absolute value temperature differential between detected new temperature $T_2$ and reference temperature $T_r$, and an absolute value temperature differential between detected new temperature $T_3$ and reference temperature $T_r$, i.e. $|T_r-T_1|$, $|T_r-T_2|$ and $|T_r-T_3|$. The temperature differentials are then compared to the selected temperature difference threshold $|\Delta T|$ already stored in controller 112 via signal 130 in step S704. In an example as illustrated in FIG. 6B, 2° F. is selected as temperature difference threshold $|\Delta T|$.

In some embodiments, if the difference between detected new temperatures $T_1$, $T_2$ and $T_3$ and reference temperature $T_r$ is greater than the selected temperature difference threshold $|\Delta T|$, then the respective color of the beam corresponding to the spot emanating the new temperature $T_1$, $T_2$ and $T_3$ may be different than the color of the beam corresponding to the reference temperature $T_r$.

In some embodiments, if any of new temperatures $T_1$, $T_2$ and $T_3$ is lower than $T_r$, and the difference between $T_r$ and the lower temperatures is greater than the selected temperature difference threshold $|\Delta T|$, then some or all of beams 648, 650 and 652 may change to a different color. For example, if portion 646 has a lower temperature than the reference temperature $T_r$ and the difference between reference temperature $T_r$ and the temperature corresponding to portion 646 is greater than the selected temperature difference threshold $|\Delta T|$, then the color of light beam 652 may change from amber to blue. As such, spot 640 may change from amber to blue, signifying that portion 646 is colder than reference temperature $T_r$. Accordingly, the user can easily determine that a temperature gradient exists between a spot corresponding to reference temperature $T_r$, which in this example by be spot 630, and spot 640, without looking at non-contact thermometer 600.

In some embodiments, if any of new temperatures $T_1$, $T_2$ and $T_3$ is more than $T_r$, and the difference between $T_r$ and the higher temperatures is greater than the selected temperature difference threshold $|\Delta T|$, then some or all some or all of beams 648, 650 and 652 may change to a different color. For example, if portion 646 has a higher temperature than reference temperature $T_r$ and the difference between the temperature corresponding to portion 646 and reference temperature $T_r$ is greater than the selected temperature difference threshold $|\Delta T|$, then the color of light beam 652 may be of a red color. As such, spot 640 may be red, signifying that portion 652 is hotter than reference temperature $T_r$. Accordingly, the user can easily determine that a temperature gradient may exist between spot 630 and spot 640, without looking at non-contact thermometer 600.

In some embodiments, if some of new temperatures $T_1$, $T_2$ and $T_3$ are more than $T_r$, and the other of new temperatures $T_1$, $T_2$ and $T_3$ are less than $T_r$, then the respective color of the beam corresponding to the spot emanating the new temperature $T_1$, $T_2$ and $T_3$ may be different than the color of the beam corresponding to the reference temperature $T_r$. For example, if portion 646 has a lower temperature than the reference temperature $T_r$, which in this example corresponds to portion 630, and the difference between the temperature corresponding reference temperature $T_r$ and the temperature corresponding to portion 646 is greater than the selected temperature difference threshold $|\Delta T|$, and if portion 642 has a higher temperature than reference temperature $T_r$ and the difference between the temperature corresponding to portion 642 and the reference temperature $T_r$ is greater than the selected temperature difference threshold $|\Delta T|$, then light beam 652 may change from an amber color to a blue color whereas light beam 648 may change from an amber color to a red color. Accordingly, a user may see that a temperature gradient may exist between spot 636 and the reference temperature $T_r$, and another temperature gradient may exist between reference temperature $T_r$ and spot 640, without looking at non-contact thermometer 600.

Returning to FIG. 7, controller 112 determines whether any of detected new temperatures $T_1$, $T_2$ and $T_3$ is less than reference temperature $T_r$ and whether the calculated differential between detected new temperatures $T_1$, $T_2$ and $T_3$ and reference temperature $T_r$ is greater than the selected temperature difference threshold $|\Delta T|$ (S712). If "YES," then controller 112 sends the corresponding signals 552, 554 and/or 556 to respective light emitters 528, 530 and 532 to change the color of respective light beams 546, 548 and 550 (S714). In an example embodiment, first amber color is changed to second blue color. As mentioned above, in such a case the user can easily determine where a temperature differential exists, via spots 636, 638 and 640, is more than, say for example, 2° colder than reference area, e.g., spot 624, without looking at non-contact thermometer 600.

If the determination of step S712 is "NO," then controller 112 determines whether any of detected new temperatures $T_1$, $T_2$ and $T_3$ is more than reference temperature $T_r$, and whether the calculated differential between detected temperatures $T_1$, $T_2$ and $T_3$ and reference temperature $T_r$, is greater than the selected temperature difference threshold oil $|\Delta T|$ (S716). If "YES," then controller 112 sends signal 552, 554 and/or 556 to respective light emitters 528, 530 and 532 to change the color of respective light beams 546, 548 and 550 (S718). In an example embodiment, a first amber color is changed to a third red color. As mentioned above, in such a case the user can easily determine where a temperature gradient exists, via spots 636, 638 and 640, is more than, say for example, 2" F hotter than reference area, e.g., spot 624, without looking at non-contact thermometer 600.

In some example embodiments, if the calculated differential between reference temperature $T_r$ and detected new temperatures $T_1$, $T_2$, and $T_3$ is greater or less than the selected temperature difference threshold $|\Delta T|$, and if $T_1$, $T_2$, and $T_3$ is more or less than $T_r$, e.g., portions 642, 644 and 646 have a higher or lower temperature than portion 630, the respective color of the beam corresponding to the spot emanating the new temperature $T_1$, $T_2$ and $T_3$ may be change from an amber color to a red or blue color. As such, respective spots 636, 638 and 640 will be red or blue, signifying that respective portions 642, 644 and 646 are hotter or colder than reference temperature $T_r$, a greater extent than the selected temperature difference threshold $|\Delta T|$. Accordingly, the user can easily determine where a targeted second area encounters a temperature gradient, via spots 636, 638 and 640, is more than, say for example, 2° F. hotter than or colder than reference temperature $T_r$, e.g., spot 624, without looking at non-contact thermometer 600.

If the determination of any or all of the circumstances of step S716 is "NO," then the respective first color is emitted, or is continued to be emitted (S720). Process 700 may be repeated by starting again S702 when the user re-initializes the actuator 208 or the device may be moved (S722) to a second location as shown in FIG. 6B, to detect new values of temperature $T_1$, $T_2$, and $T_3$ (S708).

Returning briefly to step S720, in other embodiments, device 600 may not be moved to a second position. In other embodiments, after waiting predetermined time period t, controller 112 may instruct radiation detector 108 to detect a second temperature. For example, there may be some cases wherein a single position will change its temperature, a non-limiting example of which includes a heating element. When a single position changes temperature, the light emitter of non-contact thermometer 600 may emit a second light beam of a second color. In some cases, second color may be the same as first color, whereas in other cases, the second color may be different from the first color.

In the above-discussed example embodiments, an actuator enables a controller to control a light emitter, or light emitters, and a radiation detector, or radiation detectors. In other embodiments, the actuator is operable to control an initial emission from the light emitter, or light emitters, and an initial detection by the radiation detector, or radiation detectors.

In the above-discussed example embodiments, a light beam may change from one color to another color based on whether a predetermined temperature difference threshold is surpassed. In other embodiments, a light beam my continuously change from an initial color, through continuous spectrum, to a final color, wherein the continuous spectrum is a weighted combination of the initial color and the final color. In these embodiments, the amount of the initial color is based on a ratio of the difference between a detected temperature and reference temperature and the difference between the detected temperature and the threshold temperature. For example, an initial color corresponding to a reference temperature may be amber, whereas and a final color corresponding to a threshold temperature may be red. In this example, the continuous spectrum may spans through amber-reds, through oranges and then through red-ambers, wherein the amber-reds indicate that the detected temperature is closer to the reference temperature whereas the red-ambers indicate that the detected temperature is closer to the threshold temperature.

In the example embodiment discussed above with respect to FIGS. 7A and 7B, step S704 is performed before step S706, which is performed before S708. In other embodiments S708 may be performed before either one of step S704 or step S706. In still other embodiments step S706 may be performed before step S704. In still other embodiments, step S704, step S706 and step S708 may be performed concurrently.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A temperature sensor device comprising:
   a light emitter operable to emit a first light having a first color and to emit a second light having a second color that is different than the first color;
   a body housing the light emitter;
   a radiation detector operable to detect temperature of a first target when the temperature sensor device is pointed at said first target and operable to detect temperature of a second target when the temperature sensor device is pointed at said second target; and
   a trigger operable to control operation of a trigger switch such that the operation of the trigger causes the trigger switch to responsively generate a trigger switch signal that is employed by a controller to control the light emitter and the radiation detector;
   wherein when the radiation detector detects a temperature of the second target that is less than a threshold amount different than the detected temperature of the first target, the light emitter emits the first light at the second target and wherein when the radiation detector detects a temperature of the second target that is more than a threshold amount above the detected temperature of the first target, the light emitter emits the second light at the second target.

2. The device of claim 1, wherein the light emitter is further operable to emit a third light having a third color that is different than the first color and the second color, and wherein when the radiation detector detects a temperature of the second target that is more than a threshold amount below the detected temperature of the first target, the light emitter emits the third light at the second target.

3. The device of claim 1, further comprising an actuator operable to enable said light emitter to emit the first light and to enable said radiation detector to detect the first heat discerning radiation.

4. The device of claim 1, wherein said radiation detector comprises a thermopile.

5. The device of claim 1, further comprising a display operable to display information based on the first temperature and to display information based on the second temperature.

6. The device of claim 1, further comprising an indicator portion operable to provide a first indication based on the first light and a second indication based on the second light.

7. The device of claim 1, wherein said light emitter comprises a light emitting diode system operable to transmit a first beam of light as the first light and to transmit a second beam of light as the second light.

* * * * *